March 25, 1947.　　　　C. A. MANN　　　　2,418,081
SPHERICAL FLUID OPERATED ROTARY MOTOR OF THE AXIALLY
MOVING SLIDING VANE TYPE
Filed Oct. 2, 1943　　　　3 Sheets-Sheet 1

INVENTOR.
CECIL A. MANN
BY
ATTORNEY.

March 25, 1947.　　　C. A. MANN　　　2,418,081
SPHERICAL FLUID OPERATED ROTARY MOTOR OF THE AXIALLY
MOVING SLIDING VANE TYPE
Filed Oct. 2, 1943　　　3 Sheets-Sheet 2
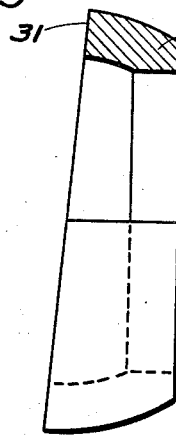
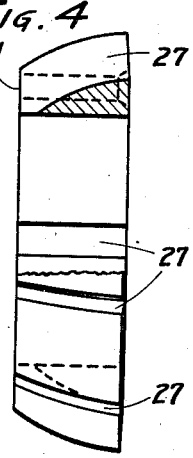
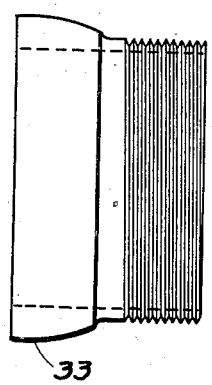
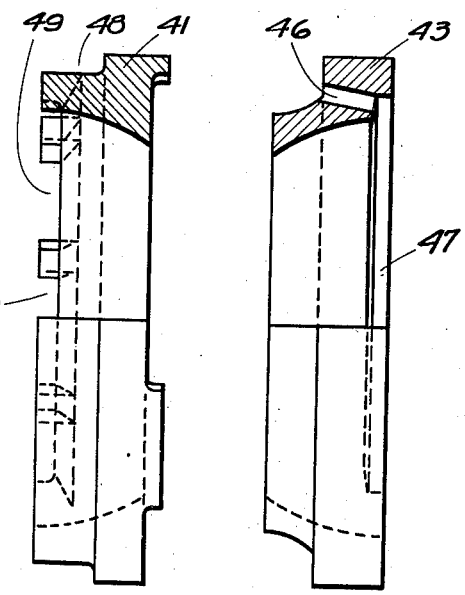
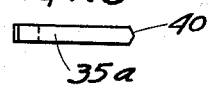
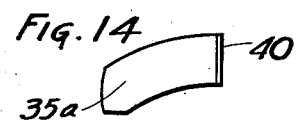
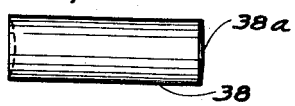
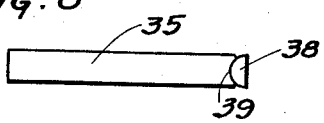
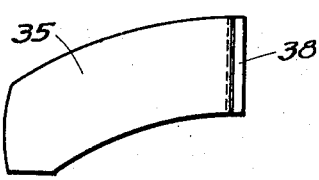
INVENTOR.
CECIL A. MANN
BY
ATTORNEY.

March 25, 1947.  C. A. MANN  2,418,081
SPHERICAL FLUID OPERATED ROTARY MOTOR OF THE AXIALLY
MOVING SLIDING VANE TYPE
Filed Oct. 2, 1943   3 Sheets-Sheet 3

INVENTOR.
CECIL A. MANN
BY
ATTORNEY.

Patented Mar. 25, 1947

2,418,081

UNITED STATES PATENT OFFICE 2,418,081

SPHERICAL FLUID OPERATED ROTARY MOTOR OF THE AXIALLY MOVING SLIDING VANE TYPE

Cecil A. Mann, Dayton, Ohio, assignor to H. Christa Smith, Cincinnati, Ohio

Application October 2, 1943, Serial No. 504,671

8 Claims. (Cl. 121—89)

This invention relates specifically to a fluid operated motor and more particularly to an apparatus embodying features of construction and operation which can also be utilized to advantage in pumps and other similar apparatus.

One object of the invention is to provide such an apparatus having high efficiency, of simple compact construction and of light weight with relation to its capacity.

A further object of the invention is to provide such an apparatus which is capable of operating at high speeds and is substantially free from vibration at all speeds.

A further object of the invention is to provide such an apparatus of the blade type in which the movement of the blades into and out of abutment forming position is of such a character that the thrust and shock of inertia thereon are reduced to a minimum.

A further object of the invention is to provide such an apparatus having a cam element the operative surface of which lies in a single plane, thus greatly facilitating the production thereof.

A further object of the invention is to provide such an apparatus in which the movement of each movable part thereof is a rotational movement about a fixed point or center.

A further object of the invention is to provide such an apparatus in which the contacting surfaces of various parts thereof are of such a character that they may be lapped to provide tightly sealed joints or close running contact.

Other objects of the invention may appear as the apparatus is described in detail.

Figure 1:
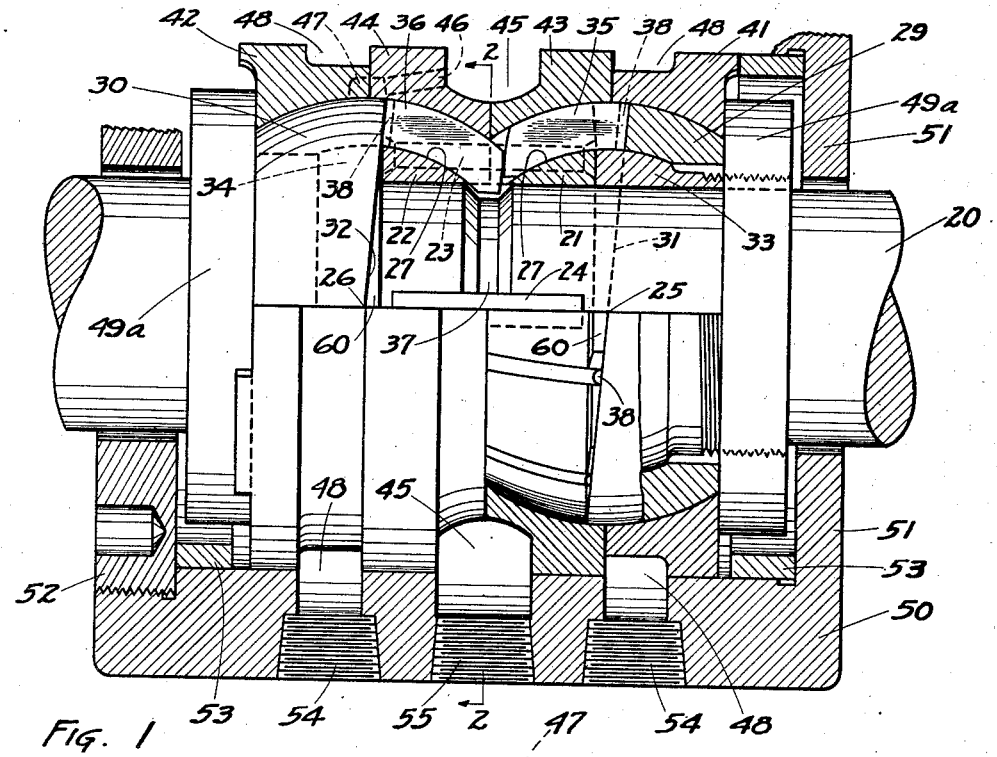
Figure 2:
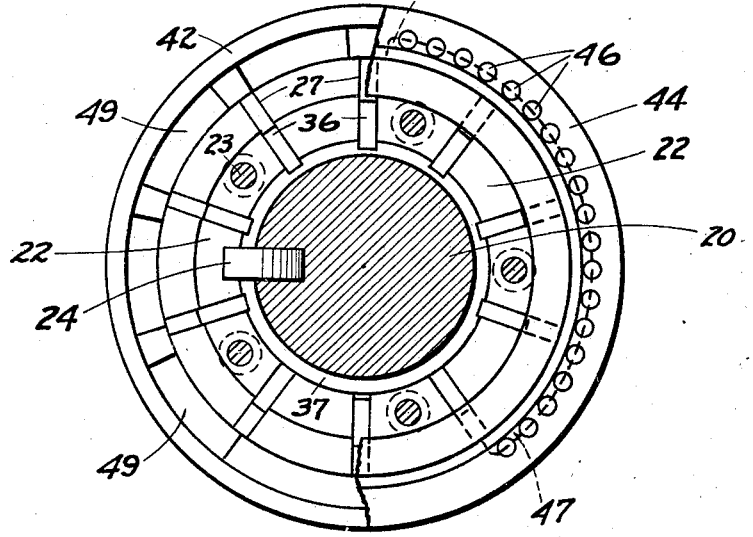
Figure 15:
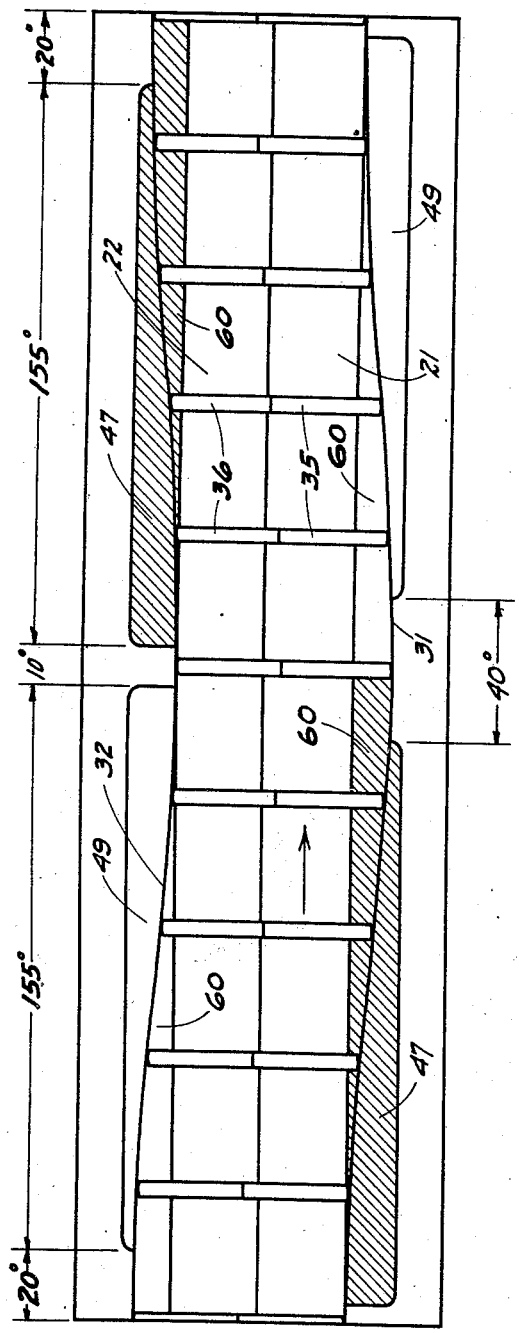

In the accompanying drawings Fig. 1 is a sectional view of a motor embodying the invention, with some of the elements partly in elevation; Fig. 2 is a section taken on the line 2—2 of Fig. 1, looking in the direction of the arrows; Fig. 3 is a side elevation, partly in section, of one of the cam elements; Fig. 4 is a side elevation, partly in section, of one of the blade carrying elements; Fig. 5 is a side elevation of one of the annular members which supports the cam element; Fig. 6 is a side elevation, partly in section, of one of the end frame members; Fig. 7 is a side elevation, partly in section, of one of the intermediate frame members; Fig. 8 is an edge view of one of the blades; Fig. 9 is a side elevation of the blade shown in Fig. 9; Fig. 10 is a front elevation of the blade shoe; Fig. 11 is an edge view of the shoe; Fig. 12 is an end view of the shoe; Fig. 13 is an edge view of another form of blade; Fig. 14 is a side elevation of the blade of Fig. 13; and Fig. 15 is a diagrammatic layout of the motor.

In these drawings I have illustrated the invention as embodied in a motor comprising a blade carrying element and a cam element the operative surface of which is in a plane inclined with relation to the plane of the cooperating surface of the blade carrying element, one of said elements being rotatable with relation to the other element. The blade, or a series of blades, is mounted in the blade carrying element for movement into and out of the space between the two elements under the control of the cam element, suitable means being provided for conducting fluid to and from said space.

The motor here illustrated is a duplex motor in which two cams are arranged at the respective sides of the blade carrier to form two work chambers and which cooperate to move the blades into and out of the respective work chambers. In the arrangement illustrated the blade carrier rotates with relation to the cams but obviously the arrangement could be reversed, without substantial change in construction, to cause the cams to rotate with relation to the blade carrier, and preferably, but not necessarily, the blade carrier is provided with two circumferential series of separate blades, the corresponding blades of the two series being actuated in unison by the cams. However, it will be understood that the motor as a whole, as well as the several parts thereof, may take various forms and that many of the features and combinations may be embodied in a single motor, that is, a motor having a working chamber on one side only of the blade carrier, or in a pump or other similar apparatus, and that the word "motor" is used in the specification and claims as a term of description and not as a limitation.

In the preferred embodiment of the invention the several parts of the apparatus are adapted to be assembled on a shaft 20 which may be either the shaft of a motor or the shaft of a pump or the like. The stationary parts of the device, that is, the parts that do not rotate with the shaft are rigidly mounted on or in a supporting structure, as will be hereinafter described.

The blade carrier may be of any suitable character and the blades may be mounted therein in any suitable manner. In the duplex motor here illustrated the blade carrier comprises two substantially identical parts 21 and 22 which face in opposite directions and are mounted on the shaft 20 for rotation therewith. Preferably the two parts of the blade carrier are arranged in abutting contact and are rigidly connected one to the other, as by rivets 23, and are connected with the shaft by a key 24. The blade carrier is provided with means for supporting and guiding a blade, or a series of blades, the blade or blades being mounted thereon for movement lengthwise of the axis of rotation of the blade carrier, and, in the present instance, about an axis extending transversely to said axis of rotation, this means preferably comprising a slot formed in the blade carrier, or a plurality of slots spaced about the axis of the blade carrier. In the duplex motor here shown each part of the blade carrier has its outer surface shaped to conform to a section of a sphere the center of which is at the axis of rotation of the blade carrier, as shown at 25 and 26, and is provided with a circumferential series of slots 27, in the present instance ten, extending lengthwise of the axis of rotation and having their inner edges curved about an axis transverse to the axis of rotation and coincident with the center of the sphere. These slots open through the outer spherical surfaces of the respective parts of the blade carrier and the adjacent ends of corresponding slots of the two series register substantially one with the other.

Mounted about the shaft on opposite sides of the blade carrier and held against rotation with the shaft are cam elements 29 and 30 provided with annular cam surfaces 31 and 32 opposed to the adjacent lateral surfaces of the respective blade carriers and so arranged with relation to said lateral surfaces as to form work chambers 60 between the respective cam surfaces and the adjacent surfaces of the blade carrier. The cam surface of each cam element has a part in sealed running contact with the slotted portion of the adjacent lateral surface of the blade carrier and a part spaced from the blade carrier to form the work chamber. In the preferred construction the cam element is annular in form, with its axis coincident with the axis of rotation of the shaft, and has that surface thereof which is adjacent to the slotted portion of the lateral surface of the blade carrier flat and in a plane oblique to the axis of rotation and extending through the center of the sphere to the adjacent portion of the blade carrier, and is therefore at an acute angle to the plane of the blade carrier, so that it functions as a cam which has contact with the blade carrier at one point only. The slotted portion of the lateral surface of the blade carrier is slightly inclined with relation to the unslotted portion thereof so that it is parallel with the cam surface at the point of contact therewith and has sealed running contact therewith throughout the radial width of the work chamber. The cam surfaces of the two cam elements are in parallel planes so that the points of contact of the two cam surfaces with the respective lateral surfaces of the blade carrier are on diametrically opposite sides of the axis of rotation of the blade carrier. Each cam element is supported on an annular member, 33 and 34, mounted on the shaft, held against rotation therewith and having one end in running contact with the unslotted inner portion of the adjacent lateral surface of the blade carrier, so that this annular member extends across and closes the inner side of the work chamber. The contacting surfaces of each lateral member and the cam element supported thereon conform to sections of spheres described about the corresponding center, 25 or 26, and the outer surfaces of the cam elements also conform to sections of spheres described about the same axes.

In the illustrated construction the two series of slots in the blade carrier are curved about transverse axes and therefore a separate series of blades 35 and 36, are mounted in the respective series of slots, each blade having its inner edge curved to conform to the curvature of the slot in which it is mounted and having its outer edge curved to conform to the outer surface of the corresponding part of the blade carrier. The blades in the two series of slots are in contact with the cam surfaces of the respective cam elements and means are provided whereby the movement imparted to a blade of one series by its cam element will be transmitted to the corresponding blade of the other series and the two blades will move in unison in both directions. In the present arrangement the blades are slidably mounted in the slots in the respective parts of the blade carrier with one end of each blade in sealed running contact with the cam surfaces of the adjacent cam element, each blade moving into and out of the corresponding work chamber as the blade carrier rotates with relation to the cam element, so that that portion of the blade which extends into the work chamber and the adjacent portion of the cam surface with which it contacts constitute respectively movable and fixed abutments against which the fluid in the work chamber acts to rotate the blade carrier. Any suitable means may be provided for retaining the end of the blade in contact with the cam surface so that it will be moved longitudinally first in one direction and then in the other direction as the blade carrier rotates and preferably the second cam is employed for that purpose. As has been heretofore stated the corresponding slots in the two parts of the blade carrier register one with the other and the blades mounted in these corresponding slots have their adjacent ends in abutting contact one with the other and are of a combined length such that the other ends thereof have sealed running contact with the respective cam surfaces, so that the relative rotation of the cam elements and blade carrier causes the blades to move in unison into and out of the respective work chambers, the abutting ends of the blades having sliding movement one on the other to permit the relative movement of the abutting ends of the blades, which is due to their curved shapes. In the present construction the blade carrier is relatively thin and the shaft is provided with a circumferential groove 37 to permit of the radial displacement of the abutting ends of the blades.

The angular relation of each blade to its cam surface changes progressively as the blade carrier rotates and it is desirable that the contacting end of each blade shall be of such a character as to maintain proper sealed contact with the cam surface at all points of contact therewith. This may be accomplished by providing the blade with a contact end portion which is movable with relation to the body of the blade, or by so shaping the end of a one piece blade that it will have adequate contact with the cam surfaces at all points. In Figs. 8 to 12 there is shown a blade the contact end of which is in the form of a shoe 38 connected with the body of the blade for movement with relation thereto about a radial axis. Preferably the shoe is semi-circular in cross section and is seated in a curved recess 39 in the end of the body of the blade, with its flat surfaces in full contact with the cam surface. See Fig. 1. The inner and outer ends of the blade are, respectively, of concave and convex spherical contour to conform to the spherical surfaces with which they are in contact. The blade is retained in its recess by its contact with the cam surface and as the angular position of the blade with relation to the cam surface changes the shoe moves about a radial or longitudinal axis on its seat to maintain its flat surface parallel with and in contact with the cam surface without modifying the effective length of the blade. In the blade 35a shown in Figs. 13 and 14 the radial corners of the contact end of the blade have been cut away or beveled, as shown at 40, at such an angle that one beveled surface may be maintained in contact with the cam surface as the blade approaches the high point of the cam and the other beveled surface will be maintained in contact with the cam surface as the blade moves away from said high point. This form of blade provides a sealed contact between the blade and the cam surfaces at all points but the sealing surfaces are of relatively small area, and the seal is not as effective with all kinds of fluids as is the seal provided with the shoe type of blade.

Mounted about the blade carrier and the cam elements is a stationary frame, or casing, which closes the outer sides of the blade slots and of the work chambers and is provided with means whereby fluid under pressure may be supplied to and exhausted from the work chambers. In the illustrated arrangement this frame comprises annular end members 41 and 42 mounted about the cam elements, and annular intermediate members 43 and 44 mounted about the respective parts of the blade carrier. The inner surfaces of the intermediate frame members are of spherical contour to conform to the contour of the respective parts of the blade carrier and to close the slots therein, the blade carrier having running contact with the frame members. The two intermediate frame members abut one against the other and the abutting portions thereof are provided with circumferential recesses to form an inlet channel 45. Each intermediate frame member is provided on one side of the motor axis with a series of inlet ports 46 connecting the channel 45 with the corresponding work chamber, the ports in the two frame members being preferably on opposite sides of the motor axis. Each intermediate frame member is in abutting contact with the adjacent end frame member and the abutting edges thereof are preferably channeled, as shown at 47, to distribute the fluid uniformly to the work chamber. The inner surfaces of the end frame members, 41 and 42, are of spherical contour to conform to the contour of the respective cam elements, 29 and 30, and to have sealing contact therewith. Each end frame member is provided with a circumferential recess 48, forming an outlet or exhaust channel, and has a series of outlet ports 49 connecting the outlet channel with the corresponding work chamber on that side of the motor axis opposite the inlet ports for that work chamber. In the present construction the intermediate frame members extend over portions of the work chambers and the outlet ports are formed partly in the intermediate frame members.

The motor is preferably assembled by inserting the two parts of the blade carrier in the respective intermediate frame members and then connecting the two parts of the blade carrier one to the other, either before or after the parts are placed about the shaft, properly positioning the same on the shaft, and then placing the annular members 33 on the shaft in engagement with the blade carrier. The blades are then inserted lengthwise in the respective slots and the cam elements and end frame members placed successively in position. The stationary parts are then clamped in firm contact one with the other by nuts 49a threaded on the respective annular members 33 and 34.

The assembled motor is enclosed in a housing 50 which holds the stationary parts thereof against movement by the shaft, closes the inlet and outlet channels and connects said channels respectively with supply and exhaust conduits. This housing is provided at one end with an inwardly extending flange 51 and is internally threaded at its other end to receive a nut 52, and spacing rings 53 are inserted between the end frame members 41 and 42 and the flange and nut, so that the tightening of the nut firmly connects the motor frame with the housing. The cylindrical wall of the housing fits snugly about the motor frame and thus forms the outer walls of the inlet and outlet channels. The housing is provided with opening 54 and 55 communicating respectively with the inlet and outlet channels and threaded for connection with supply and outlet conduits. These conduits will ordinarily hold the housing against movement but additional supporting means may be provided if desired.

The operation of the motor is clearly shown by the diagrammatic layout of Fig. 15. The fluid passes from each inlet 47 to the corresponding work chamber 60 between each pair of blades as the foremost blade of that pair passes the point of contact between the cam surface and the blade carrier and is supplied to the space between the blades continuously for nearly a half rotation of the blade carrier, in the present instance one hundred and forty degrees. As the foremost blade of said pair of blades passes beyond the widest part of the work chamber the space between said blades is brought into communication with the outlet 49 and the fluid is discharged from the work chamber and from the motor. The arrangement of the inlet ports for the two work chambers on opposite sides of the motor axis distributes the fluid pressure about the circumference of the blade carrier and provides a balanced operation of the motor.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent is:

1. In a fluid operated motor, a stationary annular member adapted to be mounted about a shaft, an annular blade carrier adapted to be mounted on said shaft for rotation therewith and having a circumferential series of slots extending lengthwise of its axis of rotation, a lateral surface of said blade carrier between said series of slots and said shaft having running contact with the adjacent surface of said stationary member, a stationary cam element mounted about said stationary member and having an annular cam surface opposed to the slotted portion of said lateral surface of said blade carrier, said cam surface being in a plane inclined with relation to the plane of said portion of said lateral surface and arranged to form a work chamber between said surfaces, blades mounted in the respective slots in said blade carrier for movement over and in contact with said stationary member and engaging said cam surface, means including said cam element to move said blades into and out of said work chamber, and a stationary structure arranged about said blade carrier and said cam member and having inlet and outlet passages communicating with said work chamber.

2. In a fluid operated motor, a stationary annular member adapted to be mounted about a shaft and having an outer surface curved about an axis transverse to the axis of rotation of said shaft, an annular blade carrier adapted to be mounted on said shaft for rotation therewith and having a circumferential series of slots extending lengthwise of said shaft, the inner surface of each slot being curved about said transverse axis on the same radius as the outer surface of said stationary member, and that portion of the lateral surface of said blade carrier between said series of slots and said shaft having runing contact with the adjacent surface of said stationary member, a stationary cam element mounted about said stationary member and having an annular cam surface in a plane oblique to the axis of said shaft, opposed to the slotted portion of the adjacent lateral surface of said blade carrier and having at one point only sealed running contact with said lateral surface, blades mounted in the respective slots in said blade carrier, engaging said cam surface and having the inner edges thereof curved about said transverse axis for running contact with the inner surfaces of said slots and with said curved surface of said stationary member, means cooperating with said cam element to move said blades into and out of said work chamber, and a stationary structure extending about said blade carrier and said cam member and having inlet and outlet passages connected with said work chamber.

3. In a fluid operated motor, a rotatable blade carrier adapted to be mounted on a shaft for rotation therewith and having an outer surface conforming substantially to a section of a sphere the center of which is at the axis of rotation of said blade carrier, said blade carrier having a circumferential series of slots extending lengthwise of said axis of rotation and each having its inner wall curved about an axis transverse to said axis of rotation and coincident with the center of said sphere, blades slidably mounted in the respective slots, each blade having its inner and outer edges curved about said transverse axis, a stationary cam element adapted to be mounted about said shaft, having an outer surface conforming substantially to a section of a sphere described about said center and having an annular cam surface opposed to the slotted portion of the adjacent lateral surface of said blade carrier and contacting the ends of said blades, said cam surface being in a plane intersecting said axis of rotation and at an acute angle to the plane of said lateral surface of said blade carrier and arranged to form a work chamber between said surfaces, an annular part extending across and enclosing the inner side of said work chamber, an outer structure having an inner surface conforming substantially to a section of a sphere described about said center, contacting the outer surfaces of said blade carrier and said cam element and closing the outer side of said work chamber, said outer structure having inlet and outlet passages communicating with said work chamber, and means cooperating with said cam element to move said blades into and out of said work chamber.

4. In a fluid operated motor, a rotatable blade carrier adapted to be mounted on a shaft for rotation therewith and having an outer surface conforming substantially to a section of a sphere the center of which is at the axis of rotation of said blade carrier, said blade carrier having a circumferential series of slots extending lengthwise of said axis of rotation and each having its inner wall curved about an axis transverse to said axis of rotation and coincident with the center of said sphere, blades slidably mounted in the respective slots, each blade having its inner and outer edges curved about said transverse axis, a stationary cam element adapted to be mounted about said shaft, having an outer surface conforming substantially to a section of a sphere described about said center, and having an annular cam surface opposed to the slotted portion of the adjacent lateral surface of said blade carrier and contacting the ends of said blades, said cam surface being in an oblique plane intersecting the center of said sphere and having sealed running contact with said lateral surface of said blade carrier on one side of said shaft and being spaced from said surface at all other points to form a work chamber, an annular part extending across and closing the inner side of said work chamber, an outer structure having an inner surface conforming substantially to a section of a sphere described about said center, contacting the outer surfaces of said blade carrier and said cam element, and closing the outer side of said work chamber, said outer structure having inlet and outlet passages communicating with said work chamber, and means cooperating with said cam element to move said blades into and out of said work chamber.

5. In a fluid operated motor, a blade carrier adapted to be mounted on a shaft for rotation therewith and having a circumferential series of slots extending lengthwise of said shaft, two blades slidably mounted in each slot, stationary cam elements mounted about said shaft on the respective sides of said blade carrier and each provided with an annular cam surface having a part in sealed running contact with the adjacent lateral surface of the slotted portion of said blade carrier and a part spaced from said lateral surface to form a work chamber, said cam surfaces being in parallel planes oblique to the axis of rotation of said blade carrier and acting on said blades to move the corresponding blades into and out of the respective work chambers, and means for closing the inner and outer sides of said work chambers and for supplying fluid to and exhausting the same from said work chamber.

6. In a fluid operated motor, a blade carrier adapted to be mounted on a shaft and comprising two parts fixed with relation one to the other and having circumferentially spaced slots extending lengthwise of said shaft, each slot having its inner wall curved about an axis extending transversely to said shaft, blades slidably mounted in said slots and each having its inner edge curved about said transverse axis, cam elements mounted about said shaft on the respective sides of said blade carrier and each provided with an annular cam surface arranged to form a work chamber between the same and the lateral surface of the adjacent part of said blade carrier, said blade carrier and said cam elements being relatively rotatable, said cam surfaces being in parallel planes oblique to the axis of rotation of said blade carrier and acting on said blades to move the corresponding blades into and out of the respective work chambers, and means for closing the inner and outer sides of said work chambers and for supplying fluid to and exhausting the same from said work chambers.

7. In a fluid operated motor, a blade carrier comprising two parts adapted to be mounted adjacent one to the other on a shaft for rotation therewith and provided with corresponding circumferential series of slots extending lengthwise of said shaft, the inner wall of each slot being curved about an axis transverse to said shaft and the transverse axes of the two series of slots being spaced apart lengthwise of said shaft, stationary cam elements adapted to be mounted about said shaft and having annular cam surfaces opposed to the adjacent lateral surfaces of the slotted portions of the respective blade carriers and arranged in parallel planes oblique to the axis of said blade carrier, said cam surfaces having parts in sealed running contact with the respective lateral surfaces and other parts spaced from said lateral surfaces to form work chambers, the two cam surfaces being spaced one from the other equal distances at all circumferential points, blades slidably mounted in the respective slots and having their inner edges curved to conform to the curvature of the inner walls of said slots, the blades in the corresponding slots of the two series being in abutting contact one with the other and being of a combined length equal to the distances between said cam surfaces, stationary members extending across and closing the inner sides of said work chambers, and a stationary structure extending about said blade carrier and said cam elements and provided with inlet and outlet ports for said work chambers.

8. In a fluid operated motor, a blade carrier comprising two parts rigidly connected one with the other and adapted to be mounted on a shaft for rotation therewith, the outer surfaces of the respective parts conforming substantially to sections of separate spheres, the centers of which are at the axis of said shaft, said centers being spaced axially one from the other and each part having a circumferential series of slots extending lengthwise of said shaft and curved about an axis transverse to said shaft and coincident with the center of the corresponding sphere, stationary members adapted to be mounted on said shaft in abutting engagement with the lateral surfaces of the respective parts of said blade carrier, stationary cam elements mounted on the respective stationary members, the cam element and the stationary member on each side of said blade carrier having contacting surfaces conforming to sections of spheres described about the respective aforesaid centers, said cam elements having annular cam surfaces opposed to the lateral surfaces of the slotted portions of the respective parts of said blade carrier, arranged in parallel planes oblique to the axis of said shaft and having running contact with the respective lateral surfaces on opposite sides of said shaft, blades slidably mounted in said slots and curved to conform to the curvature thereof, the blades in the corresponding slots of the two parts of said carrier having abutting contact one with the other and with the respective cam surfaces, and a stationary outer structure having inner surfaces extending about and conforming substantially to the outer surfaces of the respective parts of said blade carrier and said cam elements, said structure having circumferential inlet and outlet channels and ports connecting said chanels with the spaces between said blade carrier and said cam surfaces.

CECIL A. MANN.

REFERENCES CITED

The following references are of record in the file of this patent:

UNITED STATES PATENTS

| Number | Name | Date |
|---|---|---|
| 1,743,977 | Petersen | Jan. 14, 1930 |
| Re. 19,783 | Roberts | Dec. 3, 1935 |
| 613,223 | Boutilier | Oct. 25, 1898 |
| 723,242 | Cooey | Mar. 24, 1903 |
| 935,343 | Westinghouse | Sept. 28, 1909 |
| 13,930 | Wright | Dec. 11, 1855 |
| 2,020,611 | Knapp | Nov. 12, 1935 |

FOREIGN PATENTS

| Number | Country | Date |
|---|---|---|
| 631,254 | German | June 16, 1936 |